March 1, 1955

J. G. SAVINS 2,703,006

ROTATIONAL VISCOMETER

Filed April 10, 1953

Joseph G. Savins
INVENTOR.

BY Frederick E. Dumoulin
ATTORNEY

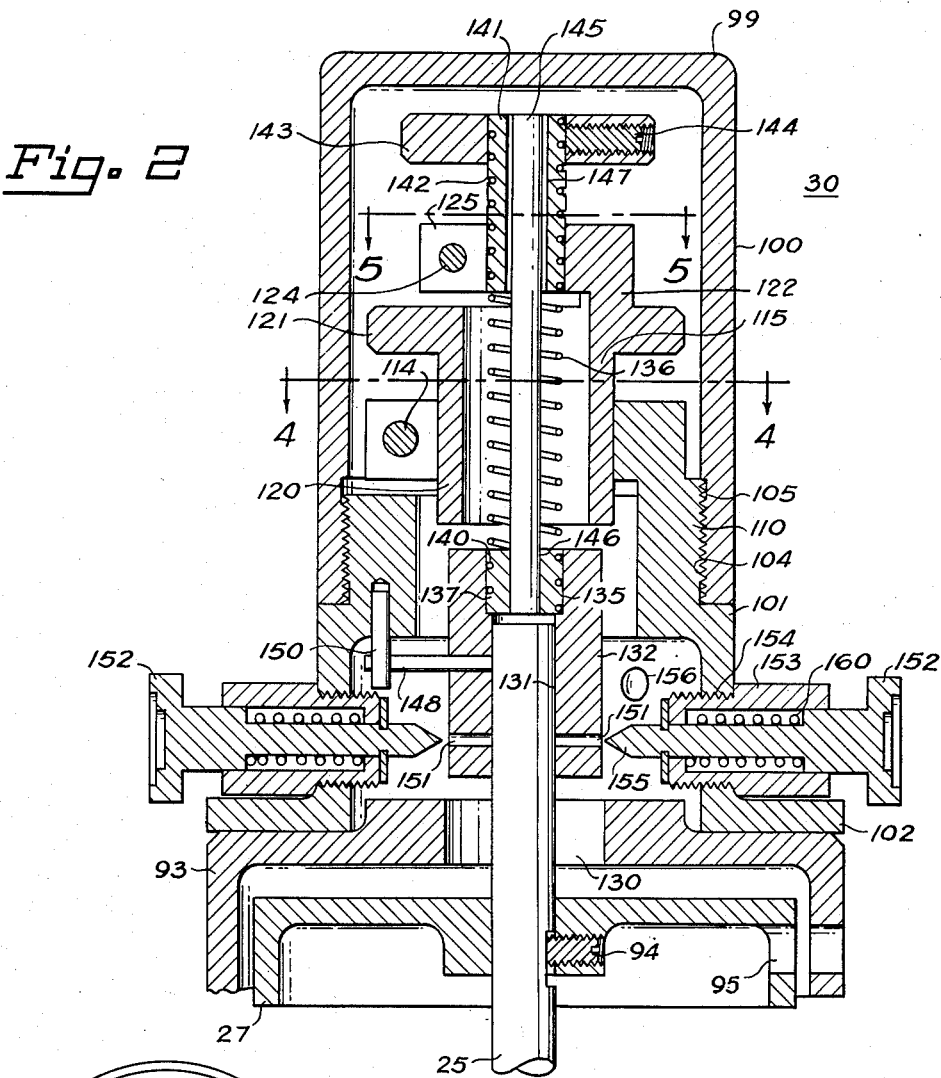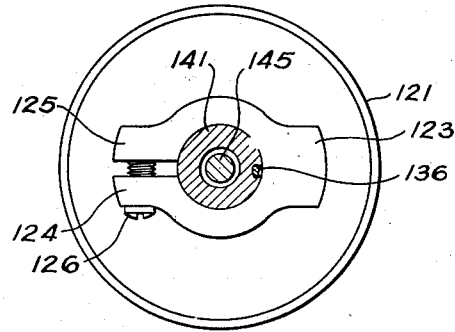

March 1, 1955

J. G. SAVINS 2,703,006

ROTATIONAL VISCOMETER

Filed April 10, 1953

JOSEPH G. SAVINS
INVENTOR.

BY Frederick E. Dumoulin
ATTORNEY

United States Patent Office 2,703,006
Patented Mar. 1, 1955

2,703,006

ROTATIONAL VISCOMETER

Joseph G. Savins, Dallas, Tex., assignor, by mesne assignments, to Socony-Vacuum Oil Company, Incorporated, New York, N. Y., a corporation of New York Application April 10, 1953, Serial No. 348,088

5 Claims. (Cl. 73—59)

This invention relates to a rotational viscometer and relates more particularly to a rotational viscometer for measuring the plastic viscosity and yield value of liquid materials exhibiting plastic flow.

The plastic viscosity and yield value of liquid materials exhibiting plastic flow may be determined by employing a rotational viscometer of the type wherein a sleeve rotating within a body of the liquid imposes a viscous drag to a bob positioned coaxially within the sleeve and separated therefrom by a thin layer of the liquid and the viscous drag upon the bob is opposed by a torque, whose value can be measured, applied to the bob. In determining the plastic viscosity and yield value of a liquid with a rotational viscometer, it has been necessary heretofore to measure the torque on the bob at various different rates of rotation of the sleeve and then mathematically calculate the plastic viscosity of the liquid from the slope of the curve of torque developed on the bob versus sleeve speed and a constant involving the viscometer geometry and mathematically calculate the yield value from the zero intercept of the curve and a constant involving the viscometer geometry. The measurement of the torque developed on the bob at various rates of rotation of the sleeve has been time-consuming and the necessity for determining the slope and the zero intercept of the curve of the torque developed on the bob versus the rate of rotation of the sleeve has tended to limit the determination of plastic viscosity and yield value of liquids exhibiting plastic flow to the laboratory where skilled personnel are available, whereas such determinations are often highly desirable in the field where such skilled personnel are unavailable.

It is an object of this invention to provide a rotational viscometer for determination of the plastic viscosity and yield value of liquids exhibiting plastic flow. It is another object of this invention to simplify determinations of plastic viscosity and yield value of liquids exhibiting plastic flow. It is another object of this invention to provide a rotational viscometer adapted for field use in determination of plastic viscosity and yield value of liquids exhibiting plastic flow. It is another object of this invention to provide a rotational viscometer which will give a direct reading of the coefficient of viscosity of a Newtonian liquid and the apparent viscosity of a non-Newtonian liquid not exhibiting plastic flow. Further objects of the invention will become apparent from the following detailed description thereof.

Figure 2 is a sectional view of the top portion of the bob shaft and the spring means associated therewith of the viscometer of Figure 1.

Figure 5 is a view partly in section taken along the line 5—5 of Figure 2.

Figure 1:
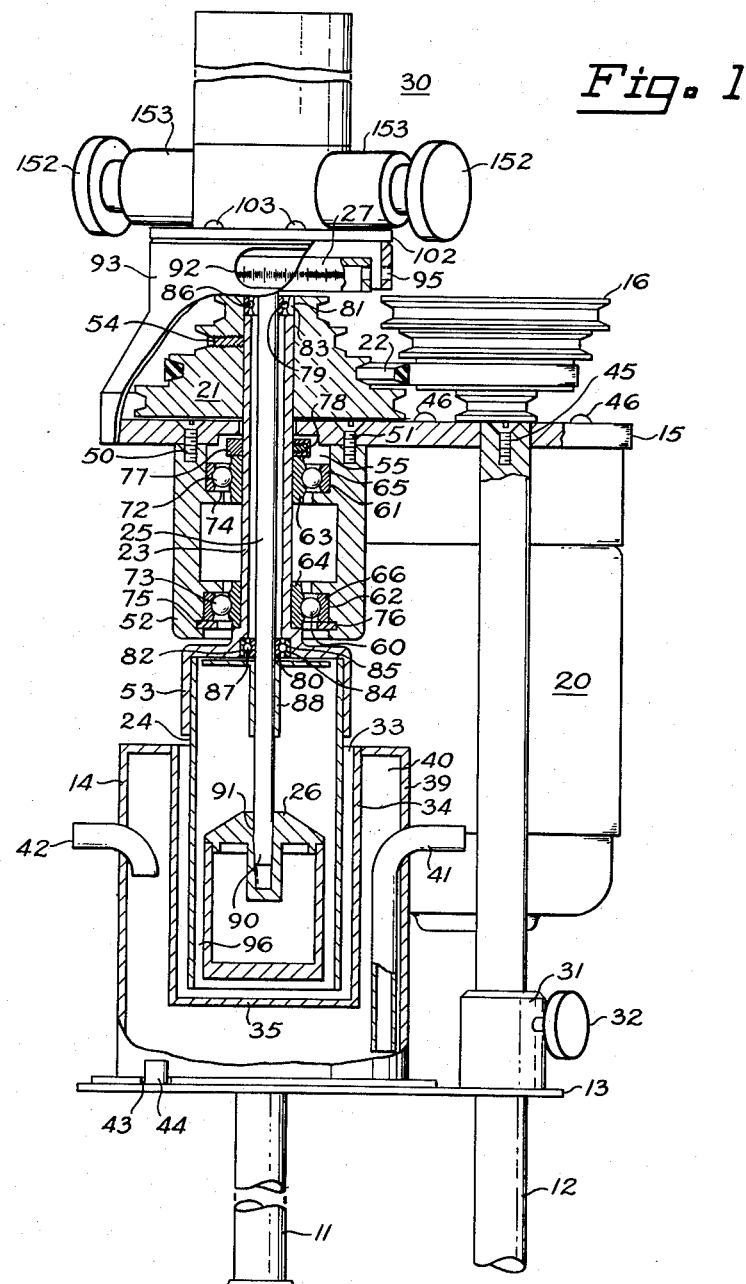
Figure 1 is a three-quarter side view partly in section of a preferred embodiment of a rotational viscometer of the invention.
Figure 3:
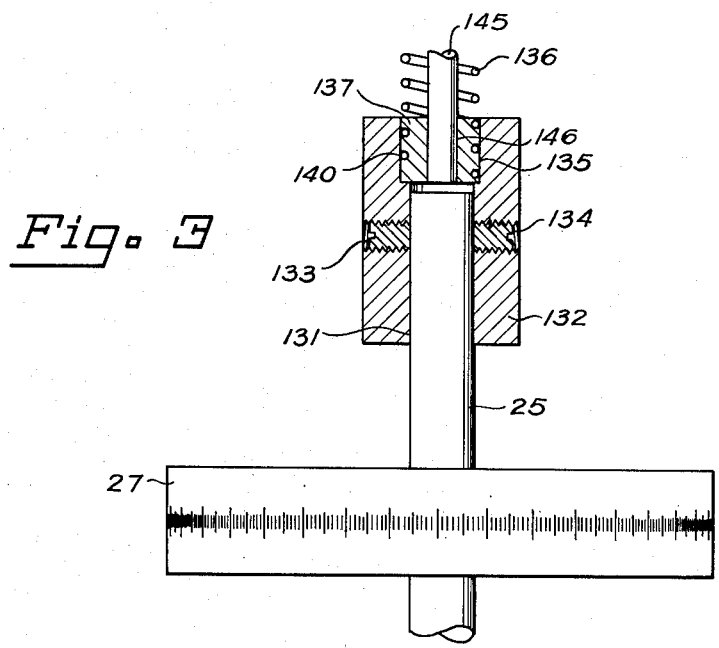
Figure 3 is a side view partly in section of the bob shaft clamping means and the indicator dial of the viscometer of Figure 1.
Figure 4:
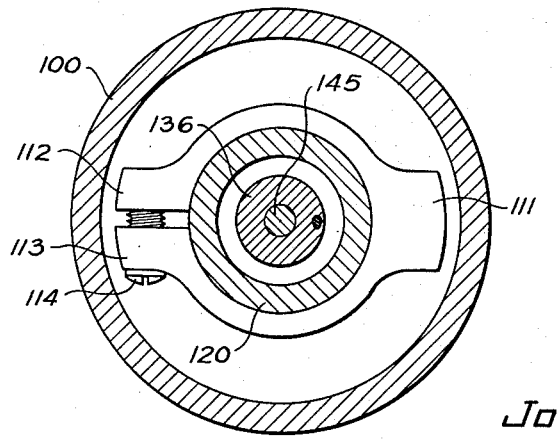
Figure 4 is a view partly in section taken along the line 4—4 of Figure 2.

Referring now to Figure 1, the viscometer comprises a base 10, rods 11 and 12, platform 13, cup 14, plate 15, pulley 16, motor 20, pulley 21, belt 22, shaft 23, sleeve 24, shaft 25, bob 26, dial 27, and spring means indicated generally at 30.

The base 10 is preferably of relatively heavy construction to provide a firm support and rods 11 and 12 are rigidly fixed on the base. Platform 13 is slidably mounted on the rods by means of sleeves affixed to the platform, sleeve 31 being shown, and the platform may be positioned at any point along the rods by means of set screws in the sleeves, set screw 32 being shown. The platform 13 supports cup 14 thereon and the cup 14 is adapted to hold the liquid whose viscometric properties are to be determined. The cup comprises a liquid-holding chamber 33 formed of inner wall 34 and bottom wall 35 and, surrounding the inner and bottom wall, a jacket 39 to provide an annulus 40 through which a fluid may be passed for maintaining the liquid in the chamber 33 at a desired temperature. Fluid for the annulus enters through fluid inlet line 41 and leaves the annulus through fluid outlet line 42. The bottom of the cup is provided with a square pin-receiving chamber 43 into which square pin 44 affixed to platform 13 fits whereby rotation of the cup on the platform is prevented.

Plate 15 is rigidly attached to rods 11 and 12 at the top thereof by means of screws, screw 45 being shown, and electric motor 20 is rigidly attached to the plate 15 by means of a plurality of screws, screws 46 being shown. The shaft of the motor protrudes above the upper surface of the plate 15 and pulley 16 is attached to and rotated by the shaft. Attached to plate 15 by means of a plurality of screws, screws 50 and 51 being shown, is bearing-support cylinder 52.

Passing through bearing-support cylinder 52 is shaft 23 which terminates at the bottom portion thereof in sleeve-receiving cap 53. Attached to the upper portion of shaft 23 is pulley 21 and the pulley is affixed to the shaft 23 by means of set screw 54. Fitting tightly within the sleeve-receiving cap 53 is sleeve 24. The bearing-support cylinder 52 is provided with bearing receptacles 55 and 60 containing bearings 61 and 62, respectively. Bearings 61 and 62 comprise internal race members 63 and 64, respectively, loosely encircling shaft 23, external race members 65 and 66, respectively, and balls 72 and 73, respectively. The race member 65 rests upon shoulder 74 within the bearing receptacle 55 and the race member 66 rests upon ring 75, which is a spring expansible ring, fitting within groove 76 in the bearing receptacle 60. Ring 77 provided with set screw 78 tightly encircles shaft 23 and contacts race member 63 to support shaft 23. Belt 22 connects pulleys 16 and 21.

Shaft 23 is a hollow shaft and positioned within this shaft is shaft 25. Tightly encircling the shaft 25 are internal race members 79 and 80 of bearings 81 and 82 and external race member 83 of bearing 81 rests on top of shaft 23. External race member 84 of bearing 82 fits within bearing receptacle 85 in sleeve-receiving cap 53. Balls 86 and 87 are positioned between the external and internal race members of the bearings 81 and 82, respectively. A guard 88 tightly encircles the shaft 25 at a position within the sleeve retaining cap and serves to prevent liquid in chamber 33 from splashing against and entering the bearing 82. The lower end of shaft 25 forms a tapered pin portion 90 which fits into axial receptacle 91 of the bob 26 whereby bob 26 may be attached to shaft 25 sufficiently tightly to be rotated by shaft 25 but to be easily removed from shaft 25. Shaft 25 extends above the pulley 21 and attached to shaft 25 above the pulley 21 is indicator dial 27 which can be read through port 92 in pulley cover member 93, and set screw 94 serves to hold the indicator dial tightly on the shaft. A port 95 is provided in pulley cover member 93 for insertion of a tool to tighten and loosen set screw 94.

The apparatus as described hereinabove is generally of conventional nature. In operation, the liquid exhibiting plastic flow, such as a fluid used in the drilling of wells in the earth, a dispersion of pigment, etc., whose plastic viscosity and yield value are to be measured is placed in chamber 33 of cup 14 and a cooled or heated fluid may be circulated through the annulus 40 from fluid inlet 41 to fluid outlet 42 to maintain the liquid in the cup at a desired temperature. Bob 26 being attached to shaft 25 and sleeve 24 being fitted into sleeve-receiving cap 53, platform 13 is raised so that the entire length of the bob will be immersed in the liquid and the annular space 96 between the bob and the sleeve will be filled with the fluid. The set screws 32 are then tightened to maintain the platform in position on the rods. Motor 20 is turned on to a desired speed whereby pulley 16 is rotated and by reason of the belt 22 between pulley 16 and pulley 21, pulley 21 rotates shaft 23 and sleeve 24 at a desired rate. By reason of the bearings 81 and 82, shaft 25 will not rotate with shaft 23. However, as sleeve 24 rotates, the liquid also rotates and the force due to viscous resistance of the liquid is transmitted throughout the liquid and is exerted as a drag on bob 26 tending to cause bob 26 to turn in the direction of rotation of the sleeve 24. A suitable torsion element is connected to shaft 25 to apply thereto a measurable, restoring torque to balance the viscous drag of the liquid on the bob. The plastic viscosity and yield value of the liquid is then calculated from the slope and the zero intercept of the curve of the torque on the bob versus cylinder speed as hereinabove mentioned.

In accordance with the invention, there are provided spring means for applying a restoring torque to the bob shaft to balance the torque imparted to the bob by the viscous drag of the liquid, and the constant of the spring, the internal radius of the rotating sleeve, and the length and the radius of the bob are so related with two predetermined rates of rotation of the sleeve that the plastic viscosity and the yield value of the liquid are a direct measure of the differences in the extent of deflection or turning of the bob at the two predetermined rates of rotation of the sleeve. More particularly, the spring constant, the internal radius of the rotating sleeve, the length and the radius of the bob, and the two predetermined rates of rotation of the sleeve are selected such that the following equations are satisfied:

(1) $$\frac{W_1}{W_1-W_2}=2$$

(2) $$\frac{75.99\frac{K_s}{L_B}\left(\frac{1}{r_b^2}-\frac{1}{r_c^2}\right)}{W_1-W_2}=1$$

(3) $$\frac{75.99\frac{K_s}{L_B}\left(\frac{1}{r_b^2}-\frac{1}{r_c^2}\right)}{4572.2 ln\frac{r_c}{r_b}}=1$$

where
$W_1$ is the higher of the two predetermined rates of rotation of the sleeve in revolutions per minute;
$W_2$ is the lower of the two predetermined rates of rotation of the sleeve in revolutions per minute;
$K_s$ is the spring constant in dyne centimeters per degree of deflection or turning;
$L_B$ is the length of the bob in centimeters;
$r_b$ is the radius of the bob in centimeters;
$r_c$ is the internal radius of sleeve in centimeters;
$ln$ is the natural logarithm; and
75.99 and 4572.2 are constants.

When the above equations are satisfied, the plastic viscosity of the fluid in centipoises will be equal numerically to the difference in degrees of the deflection of the bob at the two predetermined rates of rotation of the cylinder and the yield value of the fluid in pounds per 100 square feet will be equal numerically to the difference between the deflection in degrees of the bob at the lower of the two predetermined rates of rotation of the bob and the plastic viscosity in centipoises of the liquid. Further, the deflection in degrees of the bob at the lower of the two predetermined rates of rotation of the sleeve will be numerically equal to the viscosity in centipoises of a Newtonian fluid. The deflection in degrees of the bob at the lower of the two predetermined rates of rotation will be numerically equal to an apparent viscosity in centipoises of a non-Newtonian liquid not exhibiting plastic flow at the shear rate represented by the rate of rotation employed and at the higher of the two predetermined rates of rotation will be numerically equal to twice an apparent viscosity in centipoises of a non-Newtonian liquid not exhibiting plastic flow at the shear rate represented by the rate of rotation employed.

In the equations, the constants 75.99 and 4572.2 are factors enabling viscosity to be expressed in centipoises and the yield value in pounds per 100 square feet where the sleeve rotation is expressed in revolutions per minute and the spring constant, internal radius of the rotating sleeve and the length and radius of the bob are expressed in centimeter-gram-second units.

The spring for applying the restoring torque to the bob shaft is housed in housing 99 comprising cap 100 and base member 101 provided with flange 102. Base member 101 rests upon pulley cover member 93 and is affixed thereto by means of screws 103 through flange 102. The base member is provided with external threads 104 and the cap 100 is provided with internal threads 105, the threads 104 and 105 cooperating for affixing the cap onto the base member. The base member 101 is shaped to form upwardly extending arm 110 and clamp 111, the clamp 111 comprising two flexible arms 112 and 113. A screw 114 passes through the two arms whereby the two arms may be tightened. Positioned within the arms 112 and 113 of the clamp 111 is clamp member 115 comprising cylindrical portion 120, flange portion 121, arm 122, and clamp 123 comprising two expandable arms 124 and 125. Screw 126 passes through the two arms 124 and 125 whereby the two arms may be tightened.

Shaft 25 extends through shaft port 130 in pulley cover member 93 and is received in shaft-receiving chamber 131 in spring-base sleeve 132 and the shaft is affixed within the chamber 131 by means of set screws 133 and 134. Spring-base sleeve 132 is provided with mandrel-receiving chamber 135. Spring 136 is a double wound, cylindrical helical spring of circular cross section and is wound at its lower end around mandrel 137 which is provided with a helical groove 140 having the same pitch as the spring 136 and which is of sufficient depth to just accommodate the spring without protrusion of the spring beyond the plane of the outer surface of the mandrel. The spring 136 is wound at its upper end around mandrel 141 which is provided with helical groove 142 also of the same pitch as the spring and of sufficient depth that the spring will protrude just slightly beyond the plane of the outer surface of the mandrel, and is wound upon mandrel 141 for a sufficient portion of its length such that the free portion of the spring between mandrels 141 and 137 will have the tension selected from the equations given hereinabove. A knurled nut 143 fits over the upper portion of mandrel 141 and is affixed thereto by means of set screw 144. Pin 145, positioned interiorly of the spring, is tightly fixed within bore 146 within mandrel 137. However, the pin fits loosely, but does not touch at any point, within bore 147 of mandrel 141.

In order to prevent the bob shaft 25 and sleeve 132 from turning more than 360 degrees and thereby prevent injury to spring 136, the sleeve 132 is provided with arm 148 which is stopped by contact with pin 150 protruding from base member 101. It may be desired to limit further the number of degrees that the bob shaft 25 and sleeve 132 will turn and another pin, not shown, may be provided to protrude from base member 101 to limit the motion of the bob shaft and sleeve to the extent desired. The sleeve 132 is provided with a plurality of radially extending ports 151 and the base member 101 is provided with a pair of spring-loaded pins 152 entering the side wall thereof. The spring-loaded pins each comprise a threaded sleeve 153 screwed into threaded port 154 in the side wall of the base member, a point portion 155 and a spring 160, and pins 152, when pressed inwardly such that the point portions enter the ports 151, will prevent movement of the sleeve 132. The base member 101 is provided with a plurality of ports 156 whereby a tool may be inserted for tightening and loosening set screws 134.

As previously stated, the spring constant, the internal radius of the rotating sleeve, the length of the bob, the radius of the bob, and the two predetermined rates of rotation of the sleeve are selected such that Equations 1, 2, and 3 are satisfied. I have found it convenient in selecting these values first to select arbitrarily an internal radius for the rotating sleeve, a radius for the bob, and the higher of the two rates of rotation of the sleeve. The higher rate of rotation of the sleeve having been selected, the lower of the two rates of rotation will be fixed by Equation 1. In connection with the selection of the two rates of rotation of the sleeve, the rates selected should be such that the flow of the liquid in the cup occasioned by the rotation of the sleeve will be in the laminar region. Since the character of the flow of the liquid occasioned by the rotation of the sleeve is, for a particular combination of radius of bob and internal radius of sleeve, dependent on the ratio of the yield value and the plastic viscosity of the liquid, the selection of the two rates of rotation of the sleeve should be made taking into consideration the range of yield values and plastic viscosities of the liquids whose viscometric properties are to be measured. Having selected the internal radius of the rotating sleeve, the radius of the bob, and the two speeds of rotation of the sleeve, the values for each can be substituted in Equations 2 and 3 and the equations solved for the values of the spring constant and the length of the bob. In the event the spring constant or the length of the bob or both are outside a desired or practical range or the deflection of the bob would be greater than about 360 degrees for the range of plastic viscosities and yield values measured, other values may be selected for the internal radius of the sleeve, the radius of the bob, and the two rates of rotation of the sleeve, and the values for the spring constant and the length of the bob may be determined from these values and the procedure is repeated until desired or practical values are obtained. The values then determined for the spring constant, the length and the radius of the bob, and the internal radius of the sleeve are the values employed in construction of the respective elements of the viscometer and the two rates are the speeds employed in measurement of the viscometric properties of the liquid.

In a preferred embodiment of the invention, the two rates of rotation of the sleeve are 600 and 300 revolutions per minute, the spring constant is 361.3 dyne centimeters per degree of deflection, the bob length is 3.78 centimeters, the bob radius is 1.7245 centimeters, and the sleeve radius is 1.8245 centimeters.

The motor 20 and the pulleys 16 and 21 are designed such that the sleeve 24 can be rotated at the two rates selected. The two rates may be attained by provision of suitable windings in the motor so that the motor can be electrically controlled to provide the two desired rates of rotation, or the sheaves on the pulleys 16 and 21 may have such diameter that by changing the belt from one set of horizontally aligned sheaves to another set, the desired speeds may be obtained. If desired, a combination of control of motor speed and changing of the belt to different sheaves may be employed.

With respect to the spring 136, the provision of the mandrel 141 provides a means for changing the constant of the spring 136. The constant of the spring will depend, other things being equal, upon the free length of the spring. Since the free length of the spring, in so far as the spring constant is concerned, is its length exposed between the top of the mandrel 137 and the bottom of the mandrel 141, the free length of the spring, and hence its constant, can be varied depending upon the distance the spring is wound upon the mandrel 141. Accordingly, a spring may be selected having a length greater than the length required for the desired constant and after one end of the spring has been wound upon the mandrel 137, the spring may be wound upon mandrel 141 by screwing the mandrel into the spring by turning the mandrel by means of the knurled nut 143 to a position such that the length of the spring between the two mandrels is a length having the desired constant.

In assembling, the cylindrical portion 120 of clamp member 115 is positioned in the clamp 111 and screw 114 is tightened to clamp preliminarily the cylindrical portion therein. Spring 136 is wound upon mandrel 137 and rod 145, whose function is to keep the mandrels loosely aligned and prevent bending of the spring, is pressed into bore 146 of mandrel 137. The spring is then wound upon mandrel 141 to the position required for the desired spring constant. The spring is dropped through the opening between the arms 124 and 125 of clamp 123 and the lower edge of mandrel 141 is positioned flush with the lower edge of clamp 123. Screw 126 is tightened to clamp the mandrel 141 in position and since the groove 142 is not sufficiently deep to accommodate the spring, the spring is thereby immobilized on the mandrel. Screw 114 is then loosened and the cylindrical portion 120 of the clamp member 115 is positioned within the clamp 111 such that the spring 136 will maintain its pitch when mandrel 137 is positioned within spring base sleeve 132. The spring base sleeve 132 is brought up from below the base member 101 and the mandrel 137, with the spring wound thereon, is coated with a cement, such as resinite cement, and is pressed into the mandrel receiving chamber 135 of the sleeve whereby the spring is immobilized with respect to mandrel 137 and sleeve 132. The screw 114 is again loosened and the clamp member is turned to place the dial 27 at its zero position after which the screw 114 is again tightened. The base member 101 is then positioned on the pulley cover member 93, the top of the shaft 25 entering the shaft receiving chamber 131 of the sleeve 132. Screws 103 are tightened to affix the base member 102 to the pulley cover member 93 and set screws 133 and 134 are tightened by means of a tool inserted through the openings 156. The cover 100 is then threaded upon the base member 101.

In dismantling, for the purpose of changing the spring constant or otherwise, screws 103 are removed, set screws 133 and 134 are loosened and pins 152 are pressed inwardly such that the points thereof will enter the ports 151 and the entire assembly is removed from the top of the pulley cover member 92. By pressing the pins inwardly, should the set screws 133 and 134 not be completely cleared of shaft 25, the pins will remove the sleeve member 132 from the shaft 25 and thus hanging of the sleeve 132 on the shaft 25 is prevented and damage to the spring by over-extension is avoided.

In operation of the viscometer, the cup 14 is filled with the liquid whose viscometric properties are to be measured, the platform 13 is raised so that the sleeve and bob are immersed in the liquid with the level of the liquid being above the top of the bob, the set screws 32 are tightened, and fluid is passed through inlet line 41 to inlet line 42 to adjust the temperature of the liquid in the cup to a desired value. Then motor 20 is turned on to rotate sleeve 24 at the higher of the two predetermined rates of rotation of the sleeve. With rotation of the sleeve, the viscous drag of the fluid imparts a torque to the bob and the bob will turn, within the limits established by the pin, or pins, 150, until an equilibrium balance is reached between the restoring torque imparted to the shaft 25 by the spring and the torque imparted to the bob 26 by the viscous drag of the fluid. The extent in degrees to which the bob 26 has been deflected from the zero position is read from the dial 27. The rate of rotation of the sleeve 24 is then decreased to the lower of the two predetermined rates of rotation and the extent in degrees to which the bob is deflected from its zero position is again read from the dial 27. The difference in degrees between the deflection of the bob as indicated by the two dial readings is the plastic viscosity in centipoises and the difference between the extent of deflection in degrees of the bob from the zero position at the lower of the two speeds of rotation of the sleeve and the plastic viscosity in centipoises is the yield value in pounds per 100 square feet. Also, the extent of deflection of the bob from its zero position at the lower of the two rates of rotation of the sleeve equals the coefficient of viscosity of the liquid where the liquid is a Newtonian liquid. The deflection of the bob from its zero position at the lower of the two rates of rotation is equal to the apparent viscosity of the liquid at the shear rate represented by the rate of rotation of the sleeve where the liquid is a non-Newtonian liquid not exhibiting plastic flow. With the same type of liquid, the deflection of the bob from its zero position at the higher of the two rates of rotation is equal to twice the apparent viscosity of the liquid at the shear rate represented by the rate of rotation.

As an example of measurement of plastic viscosity and yield value of a liquid exhibiting plastic flow, a drilling fluid was placed in the cup 14 of a viscometer of the invention wherein the spring constant was 361.3 dyne centimeters per degree of deflection, the bob length was 3.78 centimeters, the bob radius was 1.7245 centimeters and the sleeve radius was 1.8245 centimeters. The sleeve was rotated at 600 revolutions per minute and the bob deflected 180 degrees at which point the restoring torque of the spring balanced the viscous drag of the drilling fluid. The sleeve was then rotated at 300 revolutions per minute and the bob deflected 120 degrees at which point the restoring torque of the spring balanced the viscous drag of the drilling fluid. The plastic viscosity of the drilling fluid was the numerical difference between the deflection of the bob at the two rates of rotation, i. e., 180–120, or 60 centipoises. The yield value of the drilling fluid was the numerical difference between the deflection of the bob at the lower of the two rates of rotation and the plastic viscosity, i. e., 120–60, or 60 pounds per 100 square feet.

As a specific example of measurement of the coefficient of viscosity of a Newtonian liquid, a lubricating oil was placed in the cup 14 of the same viscometer used for measurement of the plastic viscosity and yield value of the drilling fluid, and the sleeve was rotated at 300 revolutions per minute. The bob deflected 90 degrees at which point the restoring torque of the spring balanced the viscous drag of the oil. The coefficient of viscosity of the oil was numerically equal to the deflection of the bob or 90 centipoises.

As a specific example of measurement of the apparent viscosity of a non-Newtonian liquid not exhibiting plastic flow, an aqueous solution containing 2 percent by weight of methyl cellulose was placed in the cup 14 of the same viscometer and the sleeve was rotated at 300 revolutions per minute. The bob deflected 52 degrees at which point the restoring torque of the spring balanced the viscous drag of the solution. The apparent viscosity of the solution at the average shear rate represented by rotation of the sleeve at 300 revolutions per minute, i. e., 479 seconds$^{-1}$, was numerically equal to the extent of deflection of the bob or 52 centipoises. The sleeve was rotated at 600 revolutions per minute and the bob deflected 96 degrees at which point the restoring torque of the spring balanced the viscous drag of the solution. The apparent viscosity of the solution at the shear rate represented by rotation of the sleeve at 600 revolutions per minute, i. e., 958 seconds$^{-1}$, was numerically equal to the extent of deflection of the bob or 48 centipoises.

Having thus described my invention, it will be understood that such description has been given by way of illustration and example and not by way of limitation, reference for the latter purpose being had to the appended claims.

I claim:

1. A rotational viscometer comprising in combination a rotatable, cylindrical sleeve, means for rotating said sleeve at two predetermined rates of rotation, a cylindrical bob positioned with respect to said sleeve such that rotation of said sleeve within a liquid will rotate said liquid and thereby impart a viscous drag to said bob, means including a spring for imparting a torque to said bob proportional to the deflection of said bob from a zero position, and means for measuring the deflection of said bob from a zero position, said two predetermined rates of rotation, the internal radius of said rotatable sleeve, the length of said bob, the radius of said bob, and the constant of said spring being related such that (1) $$\frac{W_1}{W_1-W_2}=2$$

(2) $$\frac{75.99\frac{K_s}{L_B}\left(\frac{1}{r_b^2}-\frac{1}{r_c^2}\right)}{W_1-W_2}=1$$

(3) $$\frac{75.99\frac{K_s}{L_B}\left(\frac{1}{r_b^2}-\frac{1}{r_c^2}\right)}{4572.2 ln\frac{r_c}{r_b}}=1$$

where $W_1$ is the higher of said two predetermined rates of rotation of said sleeve in revolutions per minute;
$W_2$ is the lower of said two predetermined rates of rotation of said sleeve in revolutions per minute;
$K_s$ is said spring constant in dyne centimeters per degree of deflection;
$L_B$ is said length of said bob in centimeters;
$r_b$ is said radius of said bob in centimeters;
$r_c$ is said internal radius of said sleeve in centimeters;
$ln$ is the natural logarithm; and
75.99 and 4572.2 are constants.

2. A rotational viscometer comprising in combination a hollow, cylindrical, rotatable sleeve, means for rotating said sleeve at two predetermined rates of rotation, a cylindrical bob positioned coaxially with and interiorly of said sleeve such that rotation of said sleeve within a liquid will rotate said liquid and thereby impart a viscous drag to said bob, a shaft connected to said bob, a spring connected to said shaft for imparting a torque to said shaft proportional to the deflection of said bob from a zero position, and a dial connected to said shaft for indicating the deflection of said bob from a zero position, said two predetermined rates of rotation, the internal radius of said rotatable sleeve, the length of said bob, the radius of said bob, and the constant of said spring being related such that (1) $$\frac{W_1}{W_1-W_2}=2$$

(2) $$\frac{75.99\frac{K_s}{L_B}\left(\frac{1}{r_b^2}-\frac{1}{r_c^2}\right)}{W_1-W_2}=1$$

(3) $$\frac{75.99\frac{K_s}{L_B}\left(\frac{1}{r_b^2}-\frac{1}{r_c^2}\right)}{4572.2 ln\frac{r_c}{r_b}}=1$$

where $W_1$ is the higher of said two predetermined rates of rotation of said sleeve in revolutions per minute;
$W_2$ is the lower of said two predetermined rates of rotation of said sleeve in revolutions per minute;
$K_s$ is said spring constant in dyne centimeters per degree of deflection;
$L_B$ is said length of said bob in centimeters;
$r_b$ is said radius of said bob in centimeters;
$r_c$ is said internal radius of said sleeve in centimeters;
$ln$ is the natural logarithm; and
75.99 and 4572.2 are constants.

3. A rotational viscometer comprising in combination a hollow, cylindrical, rotatable sleeve, means for rotating said sleeve at two predetermined rates of rotation, a bob positioned coaxially with and interiorly of said sleeve such that rotation of said sleeve within a liquid will rotate said liquid and thereby impart a viscous drag to said bob, a rotatable shaft connected at one end to said bob, a sleeve connected to said shaft at its other end and having a mandrel-receiving chamber therein, a clamp supported above said shaft, a helical spring wound at one end thereof about a first mandrel tightly fitting within said mandrel-receiving chamber and wound at the other end thereof about a second mandrel tightly fitting within said clamp, and a dial attached to said shaft for measuring the deflection of said bob from a zero position, said two predetermined rates of rotation, the internal radius of said rotatable sleeve, the length of said bob, the radius of said bob, and the constant of said spring being related such that (1) $$\frac{W_1}{W_1-W_2}=2$$

(2) $$\frac{75.99\frac{K_s}{L_B}\left(\frac{1}{r_b^2}-\frac{1}{r_c^2}\right)}{W_1-W_2}=1$$

(3) $$\frac{75.99\frac{K_s}{L_B}\left(\frac{1}{r_b^2}-\frac{1}{r_c^2}\right)}{4572.2 ln\frac{r_c}{r_b}}=1$$

where $W_1$ is the higher of said two predetermined rates of rotation of said sleeve in revolutions per minute;
$W_2$ is the lower of said two predetermined rates of rotation of said sleeve in revolutions per minute;
$K_s$ is said spring constant in dyne centimeters per degree of deflection;
$L_B$ is said length of said bob in centimeters;
$r_b$ is said radius of said bob in centimeters;
$r_c$ is said internal radius of said sleeve in centimeters;
$ln$ is the natural logarithm; and
75.99 and 4572.2 are constants.

4. A rotational viscometer comprising in combination a hollow, cylindrical, rotatable sleeve, means for rotating said sleeve at two predetermined rates of rotation, a bob positioned coaxially with and interiorly of said sleeve such that rotation of said sleeve within a liquid will rotate said liquid and thereby impart a viscous drag to said bob, a rotatable shaft connected at one end to said bob, a sleeve connected to said shaft at its other end and having a mandrel-receiving chamber therein, a base member supported above said shaft, a first clamp positioned above said shaft and forming part of said base member, a second clamp fitting within said first clamp and positioned above said first clamp, a helical spring, said spring being wound at one end thereof about a first mandrel tightly fitting within said mandrel-receiving chamber and wound at the other end thereof about a second mandrel tightly fitting within said second clamp, and a dial attached to said shaft for measuring the deflection of said bob from a zero position, said two predetermined rates of rotation, the internal radius of said rotatable sleeve, the length of said bob, the radius of said bob, and the constant of said spring being related such that (1) $$\frac{W_1}{W_1-W_2}=2$$

(2) $$\frac{75.99\frac{K_s}{L_B}\left(\frac{1}{r_b^2}-\frac{1}{r_c^2}\right)}{W_1-W_2}=1$$

(3) $$\frac{75.99\frac{K_s}{L_B}\left(\frac{1}{r_b^2}-\frac{1}{r_c^2}\right)}{4572.2 ln\frac{r_c}{r_b}}=1$$

where
$W_1$ is the higher of said two predetermined rates of rotation of said sleeve in revolutions per minute;
$W_2$ is the lower of said two predetermined rates of rotation of said sleeve in revolutions per minute;
$K_s$ is said spring constant in dyne centimeters per degree of deflection;
$L_B$ is said length of said bob in centimeters;
$r_b$ is said radius of said bob in centimeters;
$r_c$ is said internal radius of said sleeve in centimeters;
$ln$ is the natural logarithm; and
75.99 and 4572.2 are constants.

5. A rotational viscometer comprising in combination a hollow, cylindrical, rotatable sleeve, means for rotating said sleeve at two predetermined rates of rotation, a bob positioned coaxially with and interiorly of said sleeve such that rotation of said sleeve within a liquid will rotate said liquid and thereby impart a viscous drag to said bob, a rotatable shaft connected at one end to said bob, a sleeve connected to said shaft at its other end and having a mandrel-receiving chamber and a pair of radially extending ports perpendicularly disposed with respect to said shaft therein, a base member supported above said shaft, a pair of horizontally movable pins extending through said base member and adapted to enter said radially extending ports in said sleeve, a first clamp positioned above said shaft and forming part of said base member, a second clamp fitting within said first clamp and positioned above said first clamp, a helical spring, said spring being wound at one end thereof about a first mandrel tightly fitting within said mandrel-receiving chamber and wound at the other end thereof about a second mandrel tightly fitting within said clamp, and a dial attached to said shaft for measuring the deflection of said bob from a zero position, said two predetermined rates of rotation, the internal radius of said rotatable sleeve, the length of said bob, the radius of said bob, and the constant of said spring being related such that (1) $$\frac{W_1}{W_1-W_2}=2$$

(2) $$\frac{75.99\frac{K_s}{L_B}\left(\frac{1}{r_b^2}-\frac{1}{r_c^2}\right)}{W_1-W_2}=1$$

(3) $$\frac{75.99\frac{K_s}{L_B}\left(\frac{1}{r_b^2}-\frac{1}{r_c^2}\right)}{4572.2 ln\frac{r_c}{r_b}}=1$$

where
$W_1$ is the higher of said two predetermined rates of rotation of said sleeve in revolutions per minute;
$W_2$ is the lower of said two predetermined rates of rotation of said sleeve in revolutions per minute;
$K_s$ is said spring constant in dyne centimeters per degree of deflection;
$L_B$ is said length of said bob in centimeters;
$r_b$ is said radius of said bob in centimeters;
$r_c$ is said internal radius of said sleeve in centimeters;
$ln$ is the natural logarithm; and
75.99 and 4572.2 are constants.

References Cited in the file of this patent

UNITED STATES PATENTS

| | | |
|---|---|---|
| 1,334,856 | Hayes et al. | Mar. 23, 1920 |
| 1,836,995 | Stickney | Dec. 15, 1931 |
| 2,491,639 | Bechtel et al. | Dec. 20, 1949 |
| 2,497,919 | Weltmann | Feb. 21, 1950 |

FOREIGN PATENTS

| | | |
|---|---|---|
| 711,446 | Germany | Oct. 1, 1941 |